(12) United States Patent
Kondo et al.

(10) Patent No.: US 8,109,371 B2
(45) Date of Patent: Feb. 7, 2012

(54) DAMPER

(75) Inventors: Takuhiro Kondo, Tokyo (JP); Hirofumi Inoue, Toyota (JP)

(73) Assignees: Kayaba Industry Co., Ltd., Tokyo (JP); Toyota Jidosha Kabushiki Kaisha, Aichi (JP)

( * ) Notice: Subject to any disclaimer, the term of this patent is extended or adjusted under 35 U.S.C. 154(b) by 605 days.

(21) Appl. No.: 12/298,189

(22) PCT Filed: Nov. 7, 2006

(86) PCT No.: PCT/JP2006/322515
§ 371 (c)(1),
(2), (4) Date: Oct. 23, 2008

(87) PCT Pub. No.: WO2007/125624
PCT Pub. Date: Nov. 8, 2007

(65) Prior Publication Data
US 2009/0095584 A1    Apr. 16, 2009

(30) Foreign Application Priority Data

Apr. 27, 2006  (JP) ................................. 2006-122899

(51) Int. Cl.
*F16F 15/03* (2006.01)
(52) U.S. Cl. ..................... 188/266.3; 188/266.5; 267/34; 280/5.514
(58) Field of Classification Search .............. 188/266.3, 188/266.5, 267, 267.1; 267/34, 220, 221, 267/226; 280/5.514
See application file for complete search history.

(56) References Cited

U.S. PATENT DOCUMENTS

| 5,028,037 | A | * | 7/1991 | Wang ......................... 267/64.13 |
| 5,060,959 | A | * | 10/1991 | Davis et al. ................ 280/5.514 |
| 5,070,284 | A | * | 12/1991 | Patil et al. ..................... 318/362 |
| 5,096,168 | A | * | 3/1992 | Takehara et al. .............. 267/220 |
| 5,244,190 | A | | 9/1993 | Bianchi |
| 5,293,969 | A | * | 3/1994 | Yamaoka et al. .......... 188/266.5 |
| 5,678,847 | A | * | 10/1997 | Izawa et al. ................ 280/5.515 |
| 5,996,978 | A | * | 12/1999 | Asanuma et al. ............... 267/34 |
| 6,698,729 | B2 | * | 3/2004 | Popjoy ....................... 267/64.28 |
| 2005/0230201 | A1 | * | 10/2005 | Kondou et al. ............... 188/267 |
| 2009/0065314 | A1 | * | 3/2009 | Kondo et al. ................. 188/290 |
| 2009/0120745 | A1 | * | 5/2009 | Kondo et al. ................. 188/267 |
| 2009/0121398 | A1 | * | 5/2009 | Inoue ....................... 267/140.14 |

FOREIGN PATENT DOCUMENTS

FR    2 652 783    4/1991
(Continued)

*Primary Examiner* — Christopher Schwartz
(74) *Attorney, Agent, or Firm* — McGlew and Tuttle, P.C.

(57) ABSTRACT

A damper is comprised of an actuator (A) connected to a sprung member (B) side of a vehicle, the actuator (A) including a motion converting mechanism (T) for transforming a linear motion into a rotational motion and a motor (M) to which the rotational motion resulting from the transformation by the motion converting mechanism (T) is transmitted; a hydraulic damper (E) including a cylinder (C), a piston (P) inserted slidably into the cylinder (C) and defining two pressure chambers within the cylinder (C), and a rod (R) connected at one end thereof to the piston (P), wherein a linear motion of the actuator (A) being transmitted to one of the rod (R) and the cylinder (C) while the other of the rod (R) and the cylinder (C) being connected to an unsprung member (W) side of the vehicle; and biasing means (1, 2, X, Y, Z) for biasing the hydraulic damper (E) in both compressing and extending directions.

18 Claims, 5 Drawing Sheets

FOREIGN PATENT DOCUMENTS

| | | |
|---|---|---|
| JP | 20042/1984 | 2/1984 |
| JP | 4-504239 | 7/1992 |
| JP | 8-197931 | 8/1996 |
| JP | 2001-180244 | 7/2001 |
| JP | 2003-287077 | 10/2003 |
| JP | 2004-100785 | 4/2004 |
| JP | 2005-256887 | 9/2005 |
| JP | 2005-271738 | 10/2005 |

* cited by examiner

DAMPER

FIELD OF ART

The present invention relates to an improvement of a damper for suppressing a relative movement between a vehicle body and an axle by virtue of an electromagnetic force generated in a motor.

BACKGROUND ART

As this type of a damper there has been proposed a damper comprising a hydraulic damper and an actuator for imparting a propelling force to a piston rod of the hydraulic damper, as is disclosed in Japanese Patent Laid-Open Publication No. 2001-180244. According to this proposal, a rod of a hydraulic damper is formed in a tubular shape, a female screw portion is formed on an inner periphery side of the rod, a shaft connected at one end thereof to a rotor of a motor and at an opposite end thereof to a male screw member threadably engaged with the female screw portion of the rod is inserted through the rod of the hydraulic damper, and a piston rod of the hydraulic damper is constituted by the shaft and the rod.

According to the above proposal, force which is developed at the time of moving the shaft and the rod relatively axially by the motor to extend and retract the piston rod is added to a damping force developed in the hydraulic damper, that is, the force in question is acted additionally on the damping force of the hydraulic damper by converting the torque of the motor into force acting in the direction of the relative movement between the shaft and the rod, whereby it is intended to damp oscillation.

The damper disclosed in Japanese Patent Laid-Open Publication No. H08 (1996)-197931 is made up of a coil spring which resiliently supports a vehicle body side, i.e. a sprung member side of a vehicle, a screw shaft engaged threadably and rotatably with a ball screw nut which is connected to an axle, i.e. an unsprung member side of the vehicle, a motor connected to one end of the screw shaft and supported resiliently on the sprung member side by interposition between a pair of springs, and a hydraulic damper fixed to the vehicle body side to damp vertical oscillation of the motor. With rotational torque which the motor generates, a relative movement between the vehicle body and the axle is controlled actively.

DISCLOSURE OF THE INVENTION

However, the above conventional damper involves the following problems.

In the damper disclosed in the foregoing Japanese Patent Laid-Open Publication No. 2001-180244, since the piston rod is extended forcibly by the motor, it becomes uncertain at which position the piston of the hydraulic damper is disposed with respect to the cylinder.

This causes problems. For example, if a high-frequency oscillation like a thrusting-up oscillation from a road surface is inputted in a state in which the piston is positioned near a lower end of the cylinder, the piston will come into collision with a base valve or the bottom of the cylinder. As a result, an impact resulting from the collision is propagated up to the sprung member of the vehicle body and impairs the ride comfort in the vehicle or in the worst case it may lead to a damage of the hydraulic damper.

If the piston is positioned near an upper end of the cylinder, the piston may collide with an upper portion of the cylinder in the event of bumping of the vehicle body. Also in this case, as in the above case, the ride comfort in the vehicle is deteriorated and a damage of the hydraulic damper may result. Thus, there is a problem in point of reliability of the damper.

Further, if the position of the piston with respect to the cylinder is constantly monitored and the piston is controlled so as to assume a neutral position, it follows that during travel of the vehicle the piston rod is extended or retracted to return the piston to the neutral position although this is not necessary for attitude control. Consequently, the attitude of the vehicle body changes and uneasy feeling or a sense of discomfort is given to an operator of the vehicle. Thus, the aforesaid operation does not lead to an improvement of the ride comfort in the vehicle.

In the damper disclosed in the foregoing Japanese Patent Laid-Open Publication No. H08 (1996)-197931, the piston of the hydraulic damper is established its position with respect to the cylinder because the motor is centered through a pair of springs. Consequently, the problems encountered in the damper of Japanese Patent Laid-Open Publication No. 2001-180244 are solved.

The damper of the laid-open publication H08 (1996)-197931 is provided with a motion converting mechanism comprising a screw shaft and a ball screw nut for converting the torque of the motor as a damping force generation source into a damping force to act in a linear direction. Since the inertial mass of the rotating member is large, and coupled with friction of the rotating system, the motor and the motion converting mechanism cannot perform an extending/retracting motion at the time of input of a high-frequency oscillation. Therefore, the high-frequency oscillation is absorbed by the foregoing hydraulic damper and pair of springs.

In this damper, however, the motor is oscillated directly by the high-frequency oscillation at the time of input of the high-frequency oscillation as mentioned above. Besides, the high-frequency oscillation is high in acceleration. Thus, there is a problem in point of reliability of the damper.

Moreover, the mass of the motor and that of the screw shaft are large, so in the construction wherein the motor and the screw shaft are supported resiliently by a pair of springs, the motor and the screw shaft also oscillate largely and the oscillation of the unsprung member is transmitted more easily to the sprung member. In this point the ride comfort may be deteriorated.

The present invention has been accomplished in view of the above-mentioned problems and it is an object of the present invention to provide a damper capable of improving both reliability and ride comfort in a vehicle while adopting a construction of generating a damping force by utilizing an electromagnetic force of a motor.

According to the present invention, for achieving the above-mentioned object, there is provided a damper comprising an actuator connected to a sprung member side of a vehicle, the actuator including a motion converting mechanism for transforming a linear motion into a rotational motion and a motor to which the rotational motion resulting from the transformation by the motion converting mechanism is transmitted; a hydraulic damper, the hydraulic damper including a cylinder, a piston inserted slidably into the cylinder and defining two pressure chambers within the cylinder, and a rod connected at one end thereof to the piston, wherein a linear motion of the actuator being transmitted to one of the rod and the cylinder, the other of the rod and the cylinder being connected to an unsprung member side of the vehicle; and biasing means for biasing the hydraulic damper in both hydraulic damper compressing direction and hydraulic damper extending direction.

According to the damper of the present invention, the hydraulic damper is connected in series with the actuator and is disposed on the unsprung member side, so if a high-frequency oscillation, e.g. oscillation of a relatively large acceleration, is inputted to the unsprung member when the vehicle is running on a rough road or gets on a projection of a road surface, the hydraulic damper absorbs this oscillation energy and, coupled with a oscillation transfer suppressing effect induced by the biasing means, the hydraulic damper acts to make it hard to transfer the oscillation to the actuator side.

Thus, the hydraulic damper absorbs the aforesaid oscillation and the biasing means exhibits the oscillation transfer suppressing effect, whereby the transfer of oscillation to the actuator is suppressed. Therefore, the damper of the present invention brings about the effect that the ride comfort in the vehicle is not impaired even in such a case.

Moreover, as noted above, direct action of a high-frequency oscillation on the actuator is prevented by the hydraulic damper and hence the transfer of a high-frequency oscillation of particularly a large acceleration to the motor is suppressed. As result, the reliability of the actuator as a principal component of the damper is improved and the reliability of the damper is improved while solving the problems of the conventional damper.

Further, since there is provided biasing means for biasing the hydraulic damper in both compressing direction and extending direction, there accrue not only an action of suppressing the transfer of particularly a high-frequency oscillation of the unsprung member to the actuator side, i.e. the sprung member side but also an action of returning the piston to a predetermined position with respect to the cylinder of the hydraulic damper.

That is, such a problem encountered in the conventional damper as the piston interfering with the cylinder, resulting in deterioration of the ride comfort in the vehicle or of reliability of the damper, is solved.

BEST MODE FOR CARRYING OUT THE INVENTION

Figure 1:
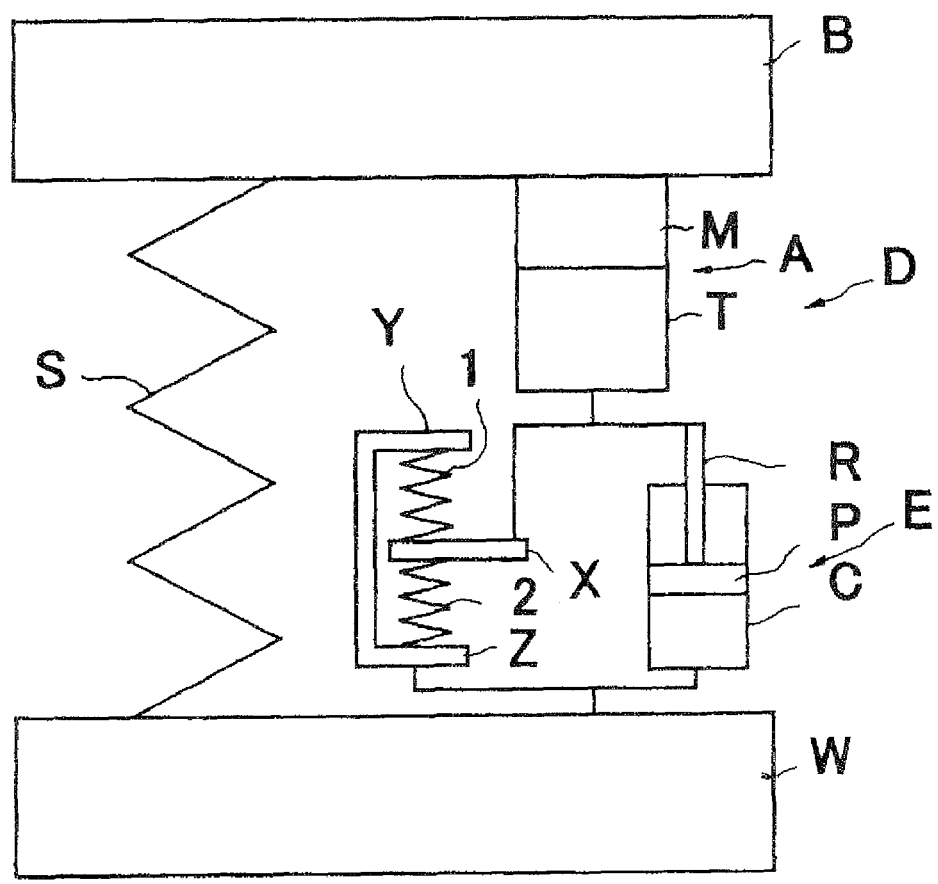
FIG. 1 illustrates a damper conceptually according to the present invention.

The present invention will be described below by way of embodiments thereof illustrated in the drawings.

As shown in FIG. 1, a damper D is interposed between an unsprung member W and a sprung member B and in parallel with a suspension spring S. Basically, the damper D is made up of a hydraulic damper E connected to the unsprung member W, an actuator A connected in series with the hydraulic damper E and also connected to the sprung member B side, springs 1 and 2, as well as a spring seat X and spring seat portions Y, Z, interposed between the actuator A and the unsprung member W and in parallel with the hydraulic damper E and serving as biasing means for biasing the hydraulic damper E in both compressing direction and extending direction.

The actuator A includes a motion converting mechanism T for transforming a linear motion into a rotational motion and a motor M to which the rotational motion resulting from transformation by the motion converting mechanism T is transmitted. For example, the motion converting mechanism T is constituted by a feed screw mechanism comprising a screw shaft and a screw nut or a mechanism comprising a rack-and-pinion or a worm gear.

In the case of the actuator A, the motor M is used as a drive source, so when there is adopted a feed screw mechanism as the rotating member in the motion converting mechanism T, the rotational motion of the member on either the screw shaft or the screw nut side as a rotating side is transmitted to the motor M. In the case where electrical energy is imparted to the motor M to drive the motor, the member on the linear motion side can be allowed to perform a linear motion, that is, the function as the actuator can be exhibited.

When a rotational motion is inputted to the motor M forcibly from the rotating member side, the motor, on the basis of an induced electromotive force, generates torque for suppressing the rotational motion of the rotating member, thus functioning so as to suppress the linear motion of the linear motion-side member. That is, in this case, the linear motion of the linear motion-side member is suppressed by regenerative torque which is generated as a result of the motor M regenerating an external kinetic energy input and converting it into electrical energy.

Therefore, in the actuator A, thrust can be imparted to the linear motion-side member by inducing torque positively in the motor M. In the case where the linear motion-side member is compelled to make a motion by an external force, the said motion can be suppressed with the regenerative torque generated by the motor M.

With the damper D, not only a relative movement between the sprung member B and the unsprung member W can be suppressed with thrust and torque generated by the actuator A, but also the attitude control for the sprung member B, more particularly, the vehicle body can be carried out by making the most of the function as the actuator. As a result, the function as an active suspension can also be exhibited.

Since it suffices for the motor M and the rotating member in the motion converting mechanism T to be connected together so as to permit transfer of a rotational motion, for example a reducer a link permitting transfer of a rotational motion, or a joint, may be interposed between the motor M and the rotating member.

As the motor M, no special limitation is made thereto insofar as the motor used can realize the above function. Various types of motors, including, for example, a DC motor, an AC motor, an induction motor and a synchronous motor, are employable.

The hydraulic damper E, although a specific construction thereof will be described later, includes a cylinder C, a piston P inserted slidably into the cylinder C and defining two pressure chambers within the cylinder C, and a rod R connected at one end thereof to the piston P. The hydraulic damper E generates a predetermined damping force at the time of extension or retraction.

In the damper D, the hydraulic damper E is interposed between the actuator A and the unsprung member W mainly for the purpose of absorbing a high-frequency oscillation. More specifically, one end of the hydraulic damper E is connected to the member on the linear motion side and an opposite end thereof is connected to the unsprung member W.

In connecting the hydraulic damper E and the actuator A with each other, it suffices that one of the cylinder C and the rod R in the hydraulic damper E is connected to the member on the linear motion side in the actuator A, while the other of the cylinder C and the rod R is connected to the unsprung member W.

Therefore, it is optional whether the hydraulic damper E is to be interposed in an erected state or in an inverted state between the actuator A and the unsprung member W.

The damper D includes a spring seat X which is immovable in the vertical direction, i.e. axial direction, with respect to one of the cylinder C and the rod R in the hydraulic damper E as biasing means, a pair of spring seat portions Y and Z which are immovable in the vertical direction, i.e. axial direction, with respect to the other of the cylinder C and the rod R in the hydraulic damper E, and springs 1 and 2 interposed respectively between the spring seat portions Y, Z and the spring seat X. More specifically, since in this embodiment it is the rod R that is connected to the actuator A, the spring seat portions Y and Z are connected to the cylinder C.

The springs 1 and 2 are interposed between the actuator A and the unsprung member W and in parallel with the hydraulic damper E, and the spring seat X positioned between the spring seat portions Y and Z is held grippingly between the two springs 1 and 2.

Consequently, the spring 1 biases the hydraulic damper E in a compressing direction and the spring 2 biases the hydraulic damper E in an extending direction.

The springs 1 and 2 not only function to suppress the transfer of particularly a high-frequency oscillation of the unsprung member W to the actuator A side, namely, the sprung member B side, but also return the piston to a predetermined position with respect to the cylinder of the hydraulic damper E.

That is, such problems as the piston P interfering with the cylinder C, resulting in the ride comfort in the vehicle being impaired, and deterioration of the damper reliability, which are encountered in the conventional damper, are solved.

Moreover, with the natural length of the springs 1, 2 and the spacing between the spring seat portions Y, Z and the spring seat X in which the springs 1 and 2 are interposed, it becomes possible to impart an initial load to the springs 1 and 2. As a result, in comparison with construction wherein the cylinder C and the rod R are connected together through one spring, it is possible to enhance the reaction force of the springs 1 and 2 against the amount of movement of the rod R relative to the cylinder C and hence possible to enhance the effect of returning the piston P to the predetermined position. Besides, the adjustment of the piston position with respect to the cylinder C can be performed by the spacing between the spring seat portions Y, Z and the spring seat X without replacing the springs 1 and 2. Further, since it is possible to adjust the initial load without replacing the springs 1 and 2, it is also possible to optimize the characteristics of the damper D to match each individual vehicle.

In the damper D, the hydraulic damper E is connected in series with the actuator A and is disposed on the unsprung member W side. Therefore, if a high-frequency oscillation such as, for example, oscillation of a relatively large acceleration is inputted to the unsprung member W when the vehicle is running on a rough road or when the vehicle gets on a projection present on a road surface, the hydraulic damper E absorbs this oscillation energy, and coupled with the oscillation transfer suppressing effect of the foregoing biasing means, the hydraulic damper E acts to make it hard to transfer the oscillation to the actuator A side.

Here, the actuator A transforms the oscillation as a linear motion inputted from the unsprung member W side into a rotational motion. In this connection, the actuator A is provided with many rotating members, which are large in inertial mass. Besides, the moment of inertia becomes large against a high-frequency oscillation and the influence of friction should also be taken into account. Thus, there is the characteristic that the oscillation on the unsprung member W side is transmitted more easily to the sprung member B side. However, as noted above, the hydraulic damper E absorbs the oscillation and the biasing means exhibits the oscillation transfer suppressing effect, thereby suppressing the transfer of the oscillation to the actuator A. Therefore, with the damper D, the ride comfort in the vehicle is not deteriorated even in such a case.

Further, as described above, a direct action of a high-frequency oscillation on the actuator A is prevented by the hydraulic damper E and hence the transfer of a high-frequency oscillation of particularly a large acceleration to the motor M is suppressed. Therefore, the reliability of the actuator A as a principal component of the damper D is improved and it is possible to solve the problems of the conventional damper and improve the reliability of the damper D.

Moreover, according to the above construction it is possible to improve the working environment of the actuator A and hence possible to reduce the cost of the actuator A.

Further, since there is adopted the construction wherein a linear motion of the actuator A is transmitted to the hydraulic damper E, that is, the motor M and the rotating members are connected to the sprung member B side, large mass, e.g. the mass of the motor M, are not included in the mass borne by the biasing means.

Therefore, even if a high-frequency oscillation is exerted on the unsprung member W, the total mass of oscillation between the sprung member B and the unsprung member W, which are supported by the biasing means, can be made light in comparison with the conventional damper wherein the motor itself is supported by a spring. Consequently, the oscillation of the unsprung member W becomes hard to be transmitted to the sprung member B, whereby it becomes possible to further improve the ride comfort.

Besides, as is apparent from the above description, the layout of wiring, etc. of the motor M is easy because the motor itself is not supported by biasing means, and there is no fear of damage to the wiring because a high-frequency oscillation is not directly inputted to the motor M itself. Accordingly, the onboard-characteristic of the damper D for the vehicle is improved, which is more practical.

If means for permitting a circumferential rotation of the springs with respect to the spring seat portions X, Z or the spring seat X is provided in the damper D, thereby permitting a circumferential rotation of the springs 1 and 2 when the springs extend or retract, torque induced by the rotation of the springs 1 and 2 does not act on the spring seat portions Y, Z and the spring seat X and hence there is no fear that the springs 1 and 2 may damage the spring seat portions Y, Z and the spring seat X.

Thus, with the above permitting means, torque induced by the rotation of the springs 1 and 2 does not act on the spring seat portions Y, Z and the spring seat X and the exertion of the torque on the hydraulic damper E and the actuator A is prevented, further, a smooth linear motion of the actuator A is not obstructed and the absorption and suppression of oscillation are effected smoothly. Consequently, the ride comfort in the vehicle can be improved positively.

Although specific biasing means is constituted by the springs 1, 2, spring seat X and spring seat portions Y, Z, there may be adopted any other construction if only the biasing means adopted can bias the hydraulic damper E in both compressing and extending directions.

Figure 2:
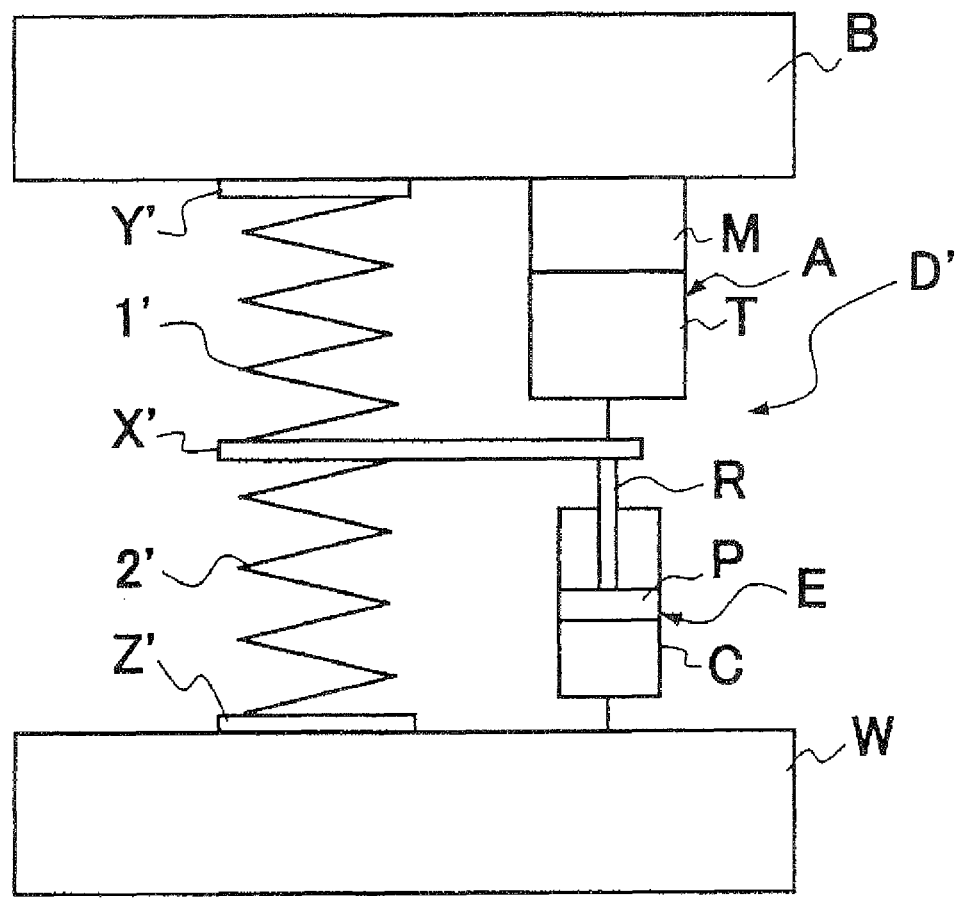
FIG. 2 illustrates another example of a damper conceptually according to the present invention.

Thus, there may be adopted such a construction of another damper D' as shown in FIG. 2. In the damper D described above, the actuator A and the hydraulic damper E are connected in series with each other and the springs 1 and 2 are interposed between the spring seat X which is immovable in the axial direction with respect to one of the cylinder C and the rod R in the hydraulic damper E and the pair of spring seat portions Y, Z which are immovable in the axial direction with respect to the other of the cylinder C and the rod D in the hydraulic damper E. On the other hand, in the damper D', although it is the same as in the above damper D that the actuator A and the hydraulic damper E are connected in series with each other, biasing means includes a spring seat portion Y' which is immovable with respect to the motor M in the actuator A, a spring seat X' which is immovable with respect to one of the cylinder C and the rod R in the hydraulic damper E, a spring seat portion Z' which is immovable in the axial direction with respect to the other of the cylinder C and the rod R in the hydraulic damper E, and springs 1' and 2' interposed respectively between the spring seat portions Y', Z' and the spring seat X'.

Even if such a construction is adopted, the foregoing functions and effects are not lost, and in the damper D', the springs 1' and 2' can cooperate with each other and function also as the suspension spring S which supports the sprung member B. Consequently, the suspension spring S and a spring seat for bearing the suspension spring S become unnecessary, the number of parts can be reduced, and the weight of the entire suspension system in the vehicle is reduced.

The spring seat portion Y' is not specially limited insofar as it is immovable in the axial direction with respect to the motor M in the actuator A. Therefore, as shown in FIG. 2, the spring seat portion Y' may be provided on the sprung member B to which the motor M is connected. Likewise, the spring seat portion Z' may be provided on the unsprung member W to which the hydraulic damper E is connected.

The damper D, which has been described above conceptually, will be described below with regard to a specific construction thereof.

Figure 3:
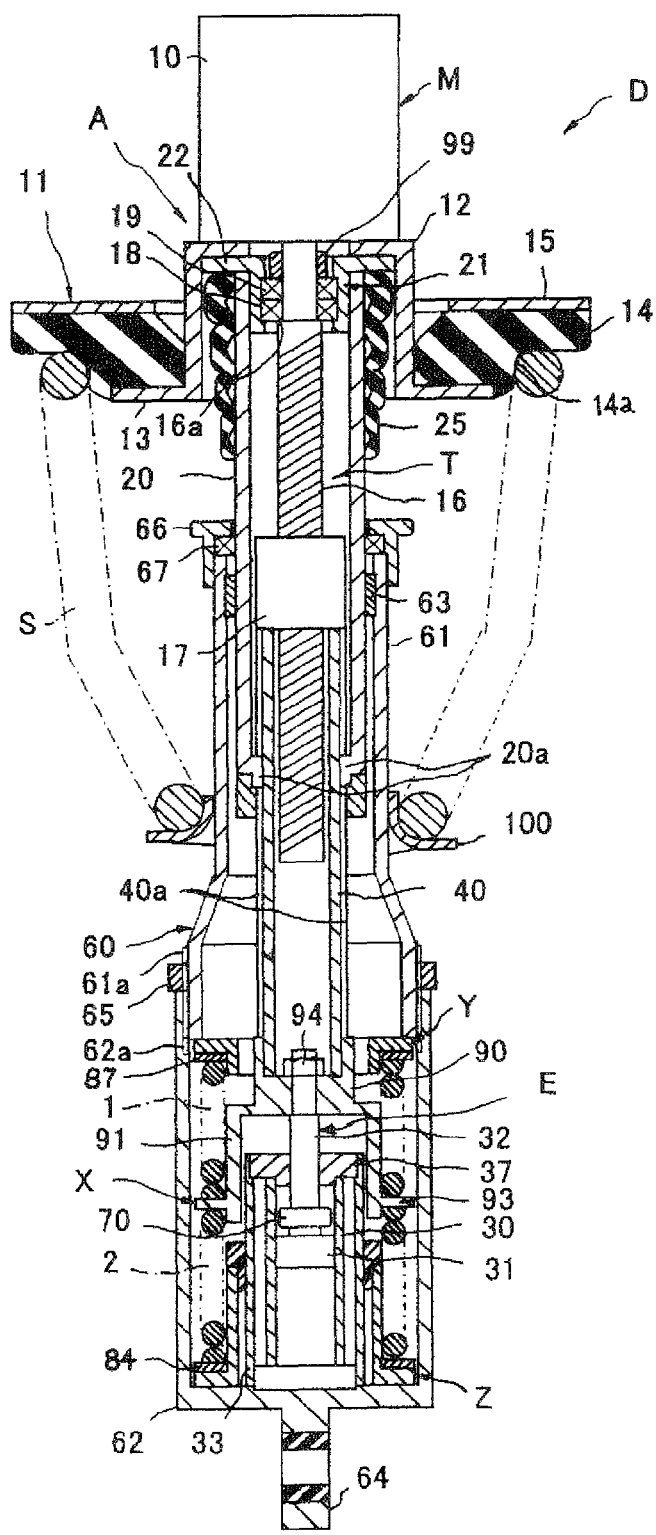
FIG. 3 is a vertical sectional view of a damper as a specific constructional example.

As shown in FIG. 3, the damper D, according to a specific construction thereof, basically comprises a hydraulic damper E connected to an unsprung member (not shown), an actuator A connected in series with the hydraulic damper E and also connected to a sprung member side (not shown), and springs 1, 2, as well as a spring seat X and spring seat portions Y, Z, which are disposed as biasing means between the actuator A and the unsprung member and in parallel with the hydraulic damper E.

More specifically, the actuator A includes a motor M and a motion converting mechanism T.

Though not shown, the motor M is made up of a case 10, a rotor and a stator. The rotor is made up of a shaft and magnets attached to the outer periphery of the shaft and it is supported by the case 10 rotatably through a ball bearing or the like.

On the other hand, the stator is made up of a core, i.e. armature core, mounted on the inner periphery of the case 10 so as to confront the aforesaid magnets, and windings wound round the core. The motor M is constituted as a so-called brushless motor.

Though not shown, a magnetic or optical sensor such as a Hall element or a resolver is mounted on the motor M as rotor position detecting means, whereby it is possible to control a damping force or control force for suppressing a relative movement between the vehicle body and an axle which the damper D generates in accordance with the condition (e.g. rotational angle or angular velocity) of a rotational motion of the rotor.

Although the motor M is here a brushless motor, various other motors are employable, including a DC and an AC motors with brush and an induction motor, insofar as they are employable as an electromagnetic force generation source, as noted above.

The motor M can be connected to a vehicular sprung member (not shown) through a mount 11. More specifically, the mount 11 is made up of a mount tube 12 formed in the shape of a hat and provided at a lower end thereof with a flange portion 13, and annular oscillation isolating rubber 14 fused to an upper end of the flange portion 13 as shown in FIG. 3, and an annular plate 15 fused to an upper end of the oscillation isolating rubber 14. The case 10 of the motor M is fixed to an upper end of the mount tube 12 and the plate 15 is fixed to the sprung member (not shown), whereby the motor M is connected to the sprung member.

The motion converting mechanism T is made up of a screw shaft 16 and a ball screw nut 17 as a screw nut.

The screw shaft 16 is supported rotatably by an inner tube 20 through ball bearings 18 and 19. More specifically, the ball bearings 18 and 19 are held by a cap member 21 fitted in an upper end of the inner tube 20 as shown in FIG. 3. The cap member 21 is provided on its outer periphery side with a flange portion 22. The flange portion 22 is fastened to an upper bottom portion of the mount tube 12 with bolts or the like (not shown).

A stepped portion 16a is formed on an upper end side of the screw shaft 16 as shown in the figure and the ball bearings 18 and 19 are held grippingly by the stepped portion 16a and the nut 99, whereby axial eccentricity of the screw shaft 16 with respect to the inner tube 20 is prevented.

The upper end of the screw shaft 16 as shown in the figure is inserted through a hole (not shown) formed in an axial portion of the upper bottom of the mount tube 12 and is connected to the rotor (not shown) of the motor M, whereby a rotational motion of the screw shaft 16 can be transmitted to the rotor of the motor M.

The ball screw nut 17 as a screw nut, which is threadably engaged with the screw shaft 16, is connected unrotatably to an upper end of a connecting tube 40 as shown in FIG. 3 smaller in diameter than the inner tube 20. The connecting tube 40 is provided on its outer periphery side with a plurality of axially extending grooves 40a and lugs 20a formed on the inner periphery side of a lower end of the inner tube 20 as shown in the figure are inserted into the grooves 40a. With the grooves 40a and the lugs 20a, the connecting tube 40 is inhibited from rotation relative to the inner tube 20.

That is, the ball screw nut 17 connected to the connecting tube 40 is inhibited from rotation relative to the inner tube 20.

The actuator A used in the damper D of this specific construction, as described above, is made up of the motor M, screw shaft 16, inner tube 20, ball screw nut 17 and connecting tube 40 and is connected to the sprung member (not shown) through the mount 11.

Thus, the inner tube 20 is connected to the mount tube 12 through the cap member 21 and the motor M is fixed to the mount tube 12. Therefore, when the motor M is driven and rotated, the screw shaft 16 rotates, but the ball screw nut 17 performs a linear motion vertically in the figure because it is inhibited from rotation relative to the inner tube 20.

Conversely, when the ball screw nut 17 performs a linear motion vertically in the figure relative to the screw shaft 16, the screw shaft 16 is rotated forcibly and so is the rotor of the motor M, because a rotational motion of the ball screw nut 17 is inhibited by both connecting tube 40 and inner tube 20.

In the case where the ball screw nut 17 undergoes an external force and is compelled to perform a linear motion, the rotor of the motor M is compelled to perform a rotational motion, as described above, so that an induced electromotive force is generated and a regenerative current flows in the windings of the motor M, which in turn generates an electromagnetic force for suppressing the rotation of the rotor.

That is, by generating an induced electromotive force in the windings, energy regeneration is allowed to take place in the motor, thereby inducing an electromagnetic force, so that torque induced by the electromagnetic force acts on the rotor of the motor M and suppresses the rotational motion of the rotor.

With the motion converting mechanism T, the torque which suppresses the rotation of the rotor acts as force for suppressing the linear motion of the ball screw nut 17, and in the damper D it acts as a damping force.

Therefore, the actuator A not only functions as an actuator which imparts a propelling force linearly to the ball screw nut 17 upon operation of the motor M, but also functions to suppress the linear motion of the ball screw nut 17.

As to the mount 11, no limitation is made to the construction described above, but any other construction may be adopted. That is, any other construction and shape may be adopted insofar as they function as the mount.

The inner tube 20 is inserted slidably through a bearing 63 into an outer tube 60 which is disposed on the outer periphery side of the inner tube.

The outer tube 60 includes a first tube 61 which covers the inner tube 20 and a bottomed, second tube 62 which is threadably engaged with the first tube 61 so as to cover a lower end portion in the figure as one end portion of the first tube 61.

At a predetermined position on the outer periphery of an intermediate portion of the first tube 61 the outer tube 60 also includes a suspension spring seat 100 for supporting a lower end of a suspension spring S which bears the mass of the vehicular sprung member. As shown in FIG. 3, the suspension spring S is interposed between a recess 14a formed in a lower portion on the outer periphery side of the oscillation isolating rubber 14 and the suspension spring seat 100.

According to such a construction, even when excessive bumping occurs in the vehicle, since the upper end of the suspension spring S is borne by the oscillation isolating rubber 14, the oscillation transmitted to the sprung member side is absorbed softly and it is thereby possible to improve the ride comfort in the vehicle.

Further, as described above, the annular bearing 63 is disposed on the inner periphery of an upper end of the first tube 61 to prevent axial eccentricity of the inner tube 20 with respect to the outer tube 60. A tubular stopper member 66 is fitted on an upper opening of the first tube 61 and an annular dust seal 67 is disposed on the inner periphery side of the stopper member 66 to provide a seal between the outer periphery of the inner tube 20 and the outer tube 60, whereby the entry of dust, rain water, etc. into the space formed by the outer tube 60 and the inner tube 20, namely, into the damper D, is prevented. Consequently, the deterioration in quality of the screw shaft 16, ball screw nut 17 and motor M as principal components of the damper D is prevented and the reliability of the damper D is improved.

Since the screw shaft 16 and the ball screw nut 17 are accommodated in both inner tube 20 and outer tube 60, they are free from interference of externally incoming stones, etc. Also in this point the reliability of the damper D is improved.

When the damper D contracts into an arbitrary length, an upper end of the stopper member 66 comes into abutment against a bump stopper 25 of a tubular bellows-like shape disposed on the outer periphery side of the upper end of the inner tube 20 as shown in FIG. 3, thus making it possible to cushion a shock which occurs at the time of contraction of the damper D. Moreover, the collision of a lower end of the screw shaft 16 with a rod 32 of the hydraulic damper E to be described later, namely, so-called bottom-out of the damper D, is prevented and thus the ride comfort in the vehicle in the most-contracted state of the damper D is improved.

The lower side of the first tube 61 is somewhat enlarged in diameter, but this is for the convenience of drawing and is not necessary. However, in case of expanding the diameter as in the drawing, this is convenient to ensure a space within the second tube 62 for accommodating the hydraulic damper E, springs 1, 2, spring seat portions Y, Z and spring seat X to be described later.

At a lower end of the second tube 62 there is provided an eye bracket 64 which can connect the damper D to the vehicular unsprung member. With the eye bracket 64 and the mount 11, the damper D is interposed between the sprung member and the unsprung member and in parallel with the suspension spring S.

When connecting the first tube 61 and the second tube 62 with each other, a screw portion 62a formed on the inner periphery side of the second tube 62 is in threaded engagement with a screw portion 61a formed on the outer periphery side of the lower end of the first tube 61. Moreover, the first and second tubes 61, 62 are inhibited from rotation by means of a lock nut 65.

Figure 4:
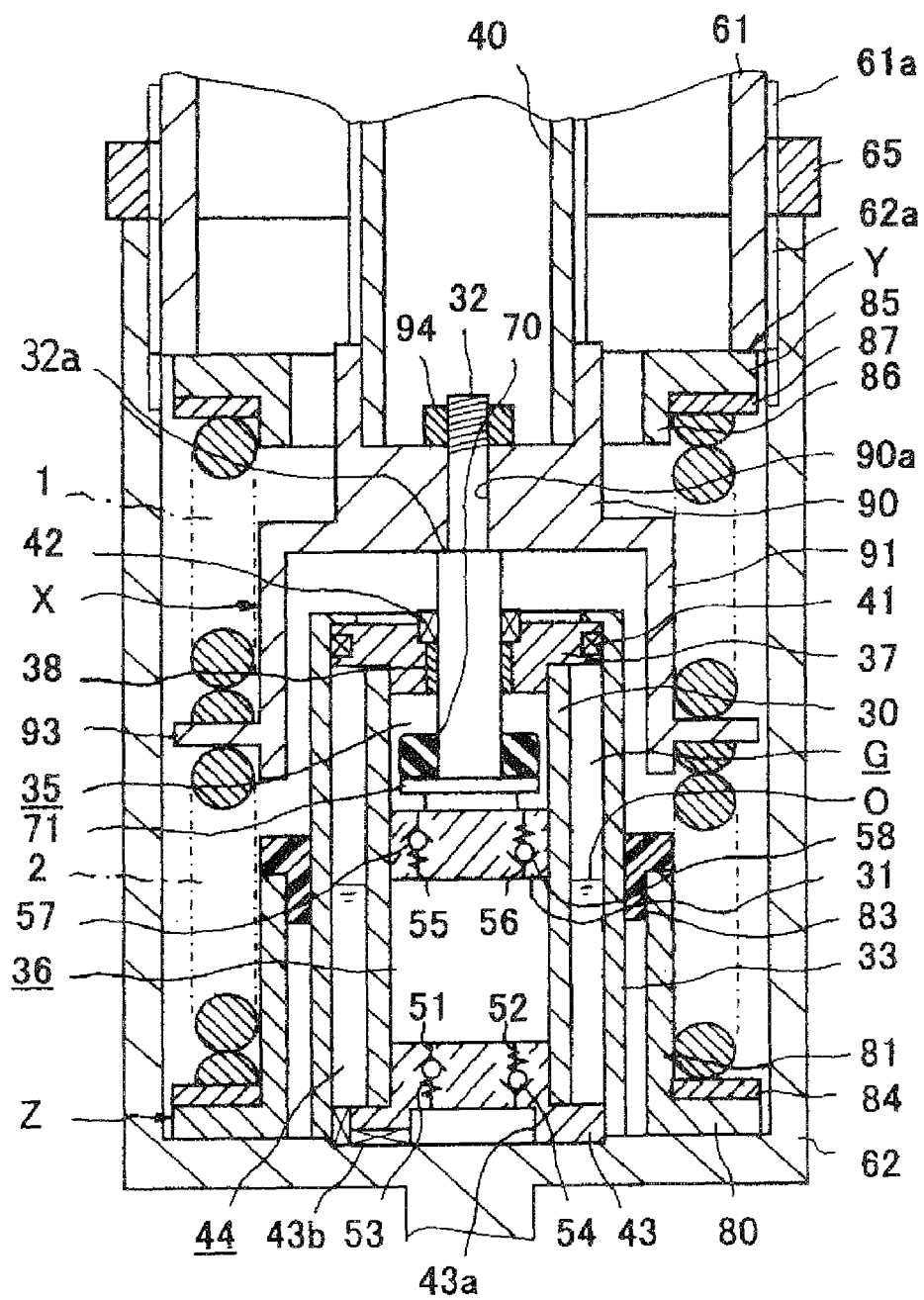
FIG. 4 is an enlarged vertical sectional view of a hydraulic damper portion in the damper as a specific constructional example.

On the other hand, as shown in FIG. 4, the hydraulic damper E includes a cylinder 30, a piston 31 inserted slidably into the cylinder 30 and defining within the cylinder 30 an upper pressure chamber 35 and a lower pressure chamber 36 as in the figure, a rod 32 connected at one end thereof to the piston 31, and a reservoir tube 33 which covers the outer periphery side of the cylinder 30.

To be more specific, a stepped portion (not shown) formed at a lower portion of an annular head member 37 is fitted in an upper-end opening of the cylinder 30. The head member 37 is fitted inside the reservoir tube 33 and is fixed to the reservoir tube 33 by caulking an upper-end opening of the reservoir tube 33. With the head member 37, the cylinder 30 and the reservoir tube 33 are positioned concentrically.

The rod 32 is inserted through the inner periphery side of the head member 37 and a seal is provided between the head member 37 and the reservoir tube 33 with a sealing member 41 disposed on the outer periphery side of the head member 37. Further, there are provided a tubular rod guide 38 which is in sliding contact with the outer periphery of the rod 32 disposed on the inner periphery side of the head member 37, and a sealing member 42 which is in sliding contact with the outer periphery of the rod 32 to provide a seal between the rod 32 and the head member 37. In this state the reservoir tube 33 and the cylinder 30 are sealed in liquid-tight manner on their upper end side.

On the other hand, a lower end of the reservoir tube 33 is connected to the bottom of the bottomed, second tube 62 which constitutes a part of the outer tube 60 and a valve body 43 of a flanged disc shape is fitted in a lower end of the cylinder 30.

The outer periphery side of the flange of the valve body 43 is in abutment against the inner periphery of the reservoir tube 33 while the valve body 43 is fitted in the lower end of the cylinder 30, so the reservoir tube 33 and the cylinder 30 are positioned concentrically.

The valve body 43 includes a concave portion 43a formed in the bottom of the valve body, passages 51 and 52 for communication between the concave portion 43a and the pressure chamber 36, damping force generating elements 53 and 54 disposed at intermediate positions of the passages 51 and 52, and a cutout portion 43b which provides communication between the concave portion 43a and the outer periphery side of the flange.

The piston 31 includes passages 55 and 56 for communication between the pressure chambers 35 and 36 and also includes damping force generating elements 57 and 58 disposed at intermediate positions of the passages 55 and 56.

Further, on the piston 31 side of the rod 32 there are disposed an annular cushion member 70 and a stopper 71 for inhibiting movement of the annular cushion member 70 to the piston side.

Liquid, e.g. working fluid, is filled into the pressure chambers 35 and 36 formed within the cylinder 30 and a predetermined amount of liquid is filled also into a gap between the cylinder 30 and the reservoir tube 33. In this connection, a gas chamber G is formed in the gap 44 with a liquid level O as a boundary and the gap 44 functions as a reservoir.

Thus, the hydraulic damper E is formed as a so-called double tube type. Of course, the hydraulic damper E may be formed as a so-called single tube type, but, as described above, by making the hydraulic damper E a double tube type and disposing the reservoir on the outer periphery side of the cylinder there accrues an advantage that the overall length of the hydraulic damper E can be made short.

In the hydraulic damper E, when the rod 32 moves downward in the figure with respect to the cylinder 30, the piston 31 moves downward, expanding the pressure chamber 35 and contracting the pressure chamber 36.

At this time, the liquid leaves the pressure chamber 36, passes through the passage 56 and the damping force generating element 58 and flows into the pressure chamber 35. At the same time, the liquid in an amount corresponding to the volume of the rod intruding into the cylinder 30, which liquid is surplus in the cylinder 30, passes through the passage 51 and the damping force generating element 53 and flows into the gap 44 serving as a reservoir.

The hydraulic damper E generates a damping force to match a pressure loss which occurs when the liquid passes through the damping force generating elements 53 and 58.

Conversely, when the rod 32 moves upward in the figure with respect to the cylinder 30, the piston 31 moves upward, expanding the pressure chamber 36 and contracting the pressure chamber 35.

At this time, the liquid leaves the pressure chamber 35, passes through the passage 55 and the damping force generating element 57 and flows into the pressure chamber 36. Meanwhile, the liquid in an amount corresponding to a deficient amount in the cylinder 30, namely, the volume of the rod 32 leaving the interior of the cylinder 30, flows from the gap 44 as a reservoir into the cylinder 30 through the passage 52 and the damping force generating element 54.

In this case, the hydraulic damper E generates a damping force to match a pressure loss which occurs when the liquid passes through the damping force generating elements 54 and 57.

As to the damping force generating elements 53, 54, 57 and 58, there may be used, as an example of particular elements, orifices or leaf valves. Other elements are also employable insofar as they exhibit a predetermined damping action.

As shown in FIG. 4, the spring seat portion Z is disposed between the hydraulic damper E and the second tube 62. More specifically, the spring seat portion Z includes an annular base portion 80 and a tubular guide 81 which stands up from the inner periphery side of the base portion 80. The base portion 80 is placed on the bottom of the second tube 62.

An annular cushion member 83 made of resin is fitted in an upper end of the guide 81 in the spring seat portion Z, the inner periphery of the cushion member 83 being fitted on the outer periphery of the reservoir tube 33 in the hydraulic damper E. Thus, the spring seat portion Z is established its radial position by the hydraulic damper E.

Further, an annular washer 84 is stacked on an upper end of the base portion 80 in the spring seat portion Z.

On the other hand, the other spring seat portion Y is disposed so as to confront the spring seat portion Z. In other words, the spring seat portions Y and Z are juxtaposed in the upper and lower positions in the axial direction of the cylinder 30 in the hydraulic damper E.

The spring seat portion Y is of approximately the same construction as the spring seat portion Z. More specifically, the spring seat portion Y includes an annular base portion 85 and a tubular guide 86 suspending from the inner periphery side of the base portion 85. An upper end of the base portion 85 is abutted against the lower end of the first tube 61 in the outer tube 60 to restrict an upward movement of the spring seat portion Y as shown in FIG. 4.

Further, an annular washer 87 is stacked on a lower end of the base portion 85 in the spring seat portion Y.

A spring seat X is disposed between the spring seat portions Y and Z. The spring seat X includes an annular connecting portion 90 connected to the rod 32, a tube portion 91 suspended from the outer periphery side of the connecting portion 90 and disposed on the outer periphery side of the hydraulic damper E, and an annular flange portion 93 projecting from the outer periphery side of the tube portion 91.

The connecting portion 90 is formed in the shape of a bottomed tube and is formed with a hole 90a axially through the bottom so as to permit insertion therethrough of the rod 32. The bottom of the connecting portion 90 is held grippingly by both stepped portion 32a of the rod 32 and nut 94, whereby the connecting portion 90 is connected to the rod 32. That is, the spring seat X is made immovable axially with respect to the rod 32.

As shown in FIGS. 3 and 4, a lower end of the connecting tube 40 is integrally connected, for example by press-fitting, to the inner periphery of the connecting portion 90, whereby the linear motion of the actuator A can be transmitted to the rod 32.

The flange portion 93 is in opposition to the base portions 80 and 85 in the spring seat portions Y and Z. A spring 1 is interposed between an upper end of the flange portion 93 and the base portion 85 in the spring seat portion Y, while a spring 2 is interposed between a lower end of the flange portion 93 and the base portion 80 in the spring seat portion Z. The spring seat portions Y and Z are made immovable in the axial direction of the cylinder 30 of the hydraulic damper E.

Consequently, the mass borne resiliently by the springs 1 and 2 is the total mass of the spring seat X, connecting tube 40, ball screw nut 17, rod 32 of the hydraulic damper E and piston 31. Thus, the mass to be borne is lighter than that in the conventional damper.

In the damper D, when the piston 31 moves upward in FIG. 4, the cushion member 70 provided on the rod 32 comes into abutment against the head member 37 before the spring 1 contracts to the maximum extent, while when the piston 31 moves downward in FIG. 4, the cushion member 83 provided at the upper end of the spring seat portion Z comes into abutment against the lower end of the tube portion 91 of the spring seat X before the spring 2 contracts to the maximum extent.

That is, either of the cushion member 70 and 83 exhibits a cushioning effect on condition that the moving distance of the piston 31 from a neutral position established by the springs 1 and 2 is within the range of a total wire-to-wire spacing length (the total extension throughout the springs of a gap length between adjacent wires) of the springs 1 and 2. Therefore, it is possible to cushion a shock upon metal touch of the springs 1 and 2 and improve the ride comfort in the vehicle. Since the shock can be cushioned, it is possible to suppress the generation of noise from the damper D, and since deterioration of the springs 1 and 2 can be prevented, it is possible to expect the effect of maintenance frequency being reduced.

Although the cushion member 70 is received within the cylinder 30, for example a cushion member may be provided at an upper end of the tube portion 91 of the spring seat X and be brought into abutment against a lower end in the figure of the guide 86 of the spring seat portion Y at the time of extension of the hydraulic damper E.

As described above, with extension or contraction of the hydraulic damper E, the springs 1 and 2 also extend or contract. Since the springs 1 and 2 have a characteristic of rotating circumferentially at the time of extension or contraction thereof they tend to rotate circumferentially with respect to the flange portion 93 of the spring seat X and the base portions 80 and 85 in the spring seat portions Y and Z.

With this rotation of the springs 1 and 2, the washers 84 and 87 stacked on the base portions 80 and 85 create slippage relative to the base portions 80 and 85 and hence the rotation of the springs 1 and 2 is not obstructed.

That is, the springs 1 and 2, at the time of extension or contraction thereof, rotate together with the washers 84 and 87 relative to the base portions 80 and 85, so there is no fear that the wire ends of the springs 1 and 2 may scratch the surfaces of the flange portion 93 which bear the springs 1 and 2 or the bearing surfaces of the base portions 80 and 85.

Likewise, even if a geometric change of the spring 1 and that of the spring 2 are different from each other, there is no fear of the bearing surfaces of the base portions 80 and 85 being scratched by the washers 84 and 87.

Thus, since there is no fear of damage to the spring seat portions Y, Z and the spring seat X, it is possible to prevent deterioration of the spring seat portions Y, Z and the spring seat X. Also in this point the reliability of the damper D is improved.

Moreover, since the washers 84 and 87 rotate together with the springs 1 and 2, there is no exertion of torque on the flange portion 93.

That is, torque induced by rotation during extension or contraction of the springs 1, 2 and torque induced by rotation of the suspension spring S during extension or contraction of the damper D do not act on the spring seat X. Even at the time of extension or contraction of the springs 1, 2 and the damper D, the spring seat X maintains its stationary state in the circumferential direction and does not rotate circumferentially with respect to the rod 32. Thus, disconnection of the spring seat X from the rod 32 is prevented.

Besides, since no torque acts on the spring seat X itself from the springs 1 and 2, more frictional force than necessary is not developed between the grooves 40a of the connecting tube 40 and the lugs 20a of the inner tube 20. Consequently, not only smooth extension and contraction of the damper D are not obstructed, but also it becomes possible to prevent deterioration of the connecting tube 40 and the inner tube 20.

Thus, the washers 84 and 87 serve as permitting means in the damper D of such a specific construction. By constituting the permitting means with use of the washers 84 and 87 as annular members, a circumferential rotation of the springs 1 and 2 relative to the spring seat portions Y and Z can be permitted in a simple manner and at low cost. As to the interposed positions of the washers 84 and 87, the washers 84 and 87 may be stacked on upper and lower surfaces, respectively of the spring seat X, or one of the washers may be kept intact, while only the other washer may be interposed between a spring to be permitted rotation and the spring seat X.

Since the spring seat portion Y is abutted against the lower end of the first tube 61, an initial load to be applied to the springs 1 and 2 and vehicle height can be adjusted by rotating the second tube 62 relative to the first tube 61 and thereby making the second tube 62 move forward or backward axially relative to the first tube 61.

Even during adjustment of an initial load for the springs 1 and 2, since the rotation of the second tube 62 is not transmitted to the springs 1 and 2 by the washers 84 and 87, it becomes possible to prevent deterioration of the spring seat X, spring seat portions Y, Z and hence the connecting tube 40 and inner tube 20 during the said adjustment.

Further, not only the initial load for the springs 1 and 2 can be changed by axial forward or backward movement of the second tube 62, but also it becomes possible to change the neutral position of the piston 31 which is established by the springs 1 and 2.

Thus, the neutral position of the piston 31 can be changed easily without the need of replacement of the springs 1 and 2.

Since the neutral position of the piston 31 is thus adjustable, it is possible to avoid the occurrence of a case where the cushion members 70 and 83 fail to function properly. Besides, since the adjustment of an initial load can be performed without replacement of the springs 1 and 2, it also becomes possible to optimize the characteristics of the damper D so as to match each individual vehicle.

Moreover, since the initial load to be applied to the springs 1, 2 and the neutral position of the piston 31 can be changed by the above operation performed from the exterior of the damper D, the adjusting work becomes very easy.

Figure 5:
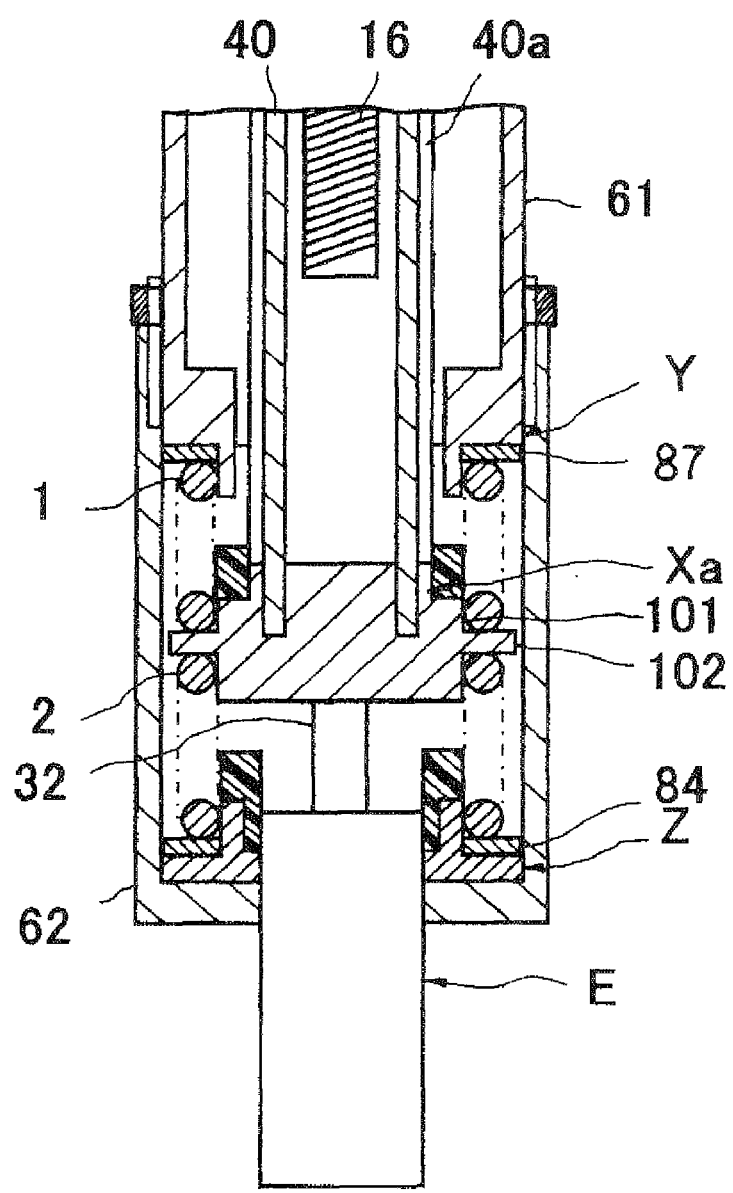
FIG. 5 is an enlarged vertical sectional view of a hydraulic damper portion in a damper as another specific constructional example.

As shown in FIG. 5, a spring seat Xa may be formed in the shape of a flanged disc including a disc-like body 101 and a flange portion 102 formed on the outer periphery of the body 101, the flange portion 102 having upper and lower surfaces to support end portions of the springs 1 and 2, respectively. The spring seat Xa may be interposed between the connecting tube 40 and the rod 32.

In this case, by forming the lower end portion of the first tube 61 almost equal in shape to the spring seat portion Y, the function of the spring seat portion Y can be realized without providing the spring seat portion Y as a separate component. Also in this case the initial load to be applied to the springs 1, 2 and neutral position of the piston 31 can be adjusted by axial forward or backward movement of the second tube 62 relative to the first tube 61.

In this case, moreover, the spring 2 may be interposed between the body 101 and an upper end in FIG. 5 of the cylinder 30 of the hydraulic damper E.

Also in this case, since the washer 87 as permitting means is stacked on the lower end portion of the first tube 61 and the washer 84 is stacked on the other spring seat portion Z, it is possible to obtain the foregoing various advantages resulting from provision of the permitting means.

Thus, in the damper D of a specific construction, the spring seat X may be of such a construction as shown in FIG. 5 insofar as an axial movement thereof relative to the rod 32 is inhibited. However, as noted above, it is very advantageous for the spring seat X to be constructed of the connecting portion 90, tube portion 91 and flange portion 93 in that there is no influence on the overall length of the damper D, because the springs 1 and 2 can be disposed on the outer periphery side of the hydraulic damper E.

In the above description the spring seat X and the spring seat Xa also function to connect the rod 32 and the connecting tube 40 with each other, so that connection of the two becomes easier. However, the spring seats X and Xa may each be connected to either the rod 32 or the connecting tube 40 insofar as the rod 32 and the connecting tube 40 are connected together by another method.

As described above, since the connecting tube 40 in the actuator A is connected to the rod 32 of the hydraulic damper E, the piston 31 connected to the rod 32 is put in sliding contact with the cylinder 30 fixed to the second tube 62 of the outer tube 60 and functions as a bearing to prevent axial eccentricity on the lower end side of the connecting tube 40. Also with the lugs 20a of the inner tube 20 whose axial eccentricity is prevented by the first tube 61, axial eccentricity of the connecting tube 40 is prevented. As a result, axial eccentricity of the screw shaft 16 with respect to the ball screw nut 17 is prevented, whereby even if a lateral force is inputted to the damper D, it is possible to prevent a load from being concentrated on certain balls (not shown) in the ball screw nut 17 and hence possible to avoid deterioration of the balls or screw grooves of the screw shaft 16.

Besides, since it is possible to prevent deterioration of the balls or screw grooves of the screw shaft 16, it is possible to maintain smoothness of the rotating motion of the screw shaft 16 relative to the ball screw nut 17 and the movement thereto in the extending or contracting direction of the damper D. Since these operations can be kept smooth, the function of the damper D is not impaired and the reliability thereof is improved also in this point by adopting this construction.

Moreover, since the hydraulic damper E is formed as a double tube type, it is possible to shorten the overall length of the damper D. In addition, since the springs 1, 2, spring seat portions Y, Z and spring seat X are disposed on the outer periphery side of the hydraulic damper E, the springs 1, 2, etc. do not exert any influence on the overall length of the damper D. This, coupled with the double tube type damper E, makes it possible to minimize the overall length of the damper D. As a result, even in the damper D in which the hydraulic damper E is connected in series with the actuator A, not only it becomes easy to secure the stroke of the damper but also the onboard-characteristic of the damper for the vehicle is improved.

Further, since the outer tube 60 is constructed of two members, namely, the first tube 61 and the second tube 62 which accommodates the hydraulic damper E, springs 1, 2, spring seat portions Y, Z and spring seat X connected to the hydraulic damper E, the actuator A side and the hydraulic damper E side can each be provided as an assembly when mounting components.

That is, the actuator A is an electric device including the motor M and the hydraulic damper E is an oil hydraulic device. Therefore, different production lines may result. However, since the devices can each be provided as an assembly, even if both are manufactured in separate factories, the damper D as a final product can be manufactured by merely combining the two. There accrues an advantage in this point and the mounting work becomes easier.

In the damper D constructed as above, when the vehicular sprung member and unsprung member undergo a force from a road surface and perform a linear relative movement, the ball screw nut 17 connected to the axle side and the screw shaft 16 connected to the sprung member side performs a linear relative movement, and this relative movement is transformed into a rotational motion of the screw shaft 16 as described above, which rotational motion is transmitted to the rotor of the motor M.

When the rotor of the motor M performs the rotational motion, the windings in the motor M cross magnetic fields of the magnets and an induced electromotive force is generated in the windings, resulting in energy regeneration and the generation of an electromagnetic force in the motor M. Consequently, a rotational torque based on the electromagnetic force caused by the induced electromotive force acts on the rotor of the motor M and suppresses the rotational motion of the rotor.

This action of suppressing the rotational motion of the rotor results in suppressing the rotational motion of the screw shaft 16. Since the rotational motion of the screw shaft 16 is thus suppressed, this suppression acts to suppress the linear motion of the ball screw nut 17, and with the aforesaid electromagnetic force, the damper D generates a control force which in this case acts as a damping force to absorb and cushion oscillation energy.

At this time, in case of supplying an electric current positively to the windings from an external power supply, the extension and contraction of the damper D can be controlled freely in the range capable of generating a control force for the damper D, by adjusting the rotational torque acting on the rotor. Therefore, it is also possible to make the damping characteristics of the damper D variable or let the damper D function as an actuator. Further, in the case where the damper D is allowed to function as an actuator to perform an appropriate control in conformity with the damping force based on the foregoing energy regeneration, it is also possible to let the damper D function also as an active suspension.

When it is not necessary to let the damper D function positively as an actuator as mentioned above, that is, if only the generation of a damping force is necessary, it goes without saying that it is not necessary to connect the motor M to an external power supply and the linear relative movement between the screw shaft 16 and the ball screw nut 17 is suppressed with an induced electromotive force developed in the windings upon forced rotation of the rotor of the motor M, namely, with the rotational torque based on the electromagnetic force induced only by energy regeneration.

In the damper D, since the hydraulic damper E is disposed on the unsprung member side, even when a high-frequency oscillation inputted from a road surface cannot be absorbed by the actuator A as in the previous description, the high-frequency oscillation is absorbed by the hydraulic damper E and the transfer thereof to the sprung member side can be prevented by the springs 1 and 2.

Thus, also in the damper D of such a specific construction as described above, even if a high-frequency oscillation, e.g. oscillation of a relatively high acceleration, is inputted to the unsprung member when the vehicle is running on a rough road or gets on a projection present on a road surface, there is obtained an effect that the ride comfort in the vehicle is not deteriorated.

Further, with the washers 84 and 87 as the foregoing permitting means, the torque of the springs 1 and 2 is not transmitted to the connecting tube 40 side and hence it is possible to suppress a frictional force developed between the grooves 40a of the connecting tube 40 and the lugs 20a of the inner tube 20, causing no obstacle to smooth extending and contracting motions of the actuator A. Consequently, absorption and suppression of oscillation are effected smoothly, whereby the ride comfort in the vehicle can be surely improved.

A brief description will now be given about a damping force based on moment of inertia. The damping force generated on the actuator A side of the damper D corresponds generally to the total sum of the force acting in the axial direction of the damper D, which force is based on inertia moment of the screw shaft 16, inertia moment of the rotor of the motor M and inertia moment of the ball screw nut 17, and the electromagnetic force generated by the motor M. Particularly, the force based on inertia moment of the rotating system becomes large in proportion to the acceleration of the extending/contracting motion of the damper D because the angular acceleration of the rotor of the motor M is proportional to the acceleration of the damper's extending/contraction motion, but the inertia moment of the rotor and that of the screw shaft 16 are relatively large and the influence thereof on the damping force is not negligible.

Since the force based on inertia moment of the rotor and that of the screw shaft 16 is proportional to the acceleration of the extending/contracting motion as described above and hence acts in a direction opposed to the axial force of the damper D which is inputted from for example a road surface to the damper, the damper D generates a damping force not dependent on the electromagnetic force of the motor M. Particularly, upon input of an abrupt force in the axial direction, the damper D generates a higher damping force, resulting in that an occupant in the vehicle perceives a rugged feeling.

Thus, a damping force based on inertia moment of the rotor and that of the screw shaft 16 generates always ahead of the damping force dependent on the electromagnetic force. Besides, the damping force induced by the inertia moment of the rotor and that of the screw shaft 16, which is dependent on the acceleration of the extending/contracting motion of the damper D, is difficult to be controlled, therefore, the smaller the inertia moment of the rotor and that of the screw shaft 16, the less can be made the influence on the damping force based on inertia moment of the rotor and that of the screw shaft 16. However, as described above, the force acting in the axial direction of the damper D on the basis of inertia moment of the rotor and that of the screw shaft 16 is absorbed by the hydraulic damper E and the springs 1, 2 and the transfer of oscillation large in acceleration to the sprung member is suppressed, so that the ride comfort in the vehicle is improved.

Further, even when a high-frequency oscillation is exerted on the unsprung member, the mass borne by the springs 1 and 2 does not include such large masses as the mass of the motor M and that of the screw shaft 16 and is light as compared with the conventional damper, so that the force for transmitting the oscillation input in the unsprung member to the sprung member is also lessened by the above reduction of weight and hence it is possible to improve the ride comfort in the vehicle.

Moreover, since the mass borne by the springs 1 and 2 becomes light and the natural frequency becomes high, there is no fear of occurrence of resonance in a particular frequency region in which an occupant in the vehicle feels uncomfortable in point of ride comfort. Also in this point it is possible to improve the ride comfort in the vehicle.

Further, since the hydraulic damper E is disposed on the unsprung member side, a space for mounting the hydraulic damper E need not be ensured inside the vehicle body, thus permitting the motor M to be fixed inside the vehicle body. Consequently, the length of the relative movement-performing portion of the damper D corresponds to the overall length of the damper D minus the length of the motor M and thus it becomes easy to ensure the stroke of the damper D. That is, in comparison with the case where the motor M is attached to the underside of the vehicle body, namely, to the outside of the vehicle body, it becomes possible to take a stroke which is longer by the length of the motor M.

Since the motor M can be disposed inside the vehicle body, electric wires (not shown) which will be extended from electrodes of the motor M can be laid inside the vehicle body and it also becomes easy to connect the electric wires to an exterior controller and control circuit. Besides, since the electric wires are stored inside the vehicle body, it becomes possible to lessen the chance of deterioration of the electric wires.

Since the motor M is fixed inside the vehicle body, the damper D can be mounted on the vehicle without changing a mounting position on the vehicle body side and the mounting position on the vehicle body side can be standardized, thus making it possible to reduce the cost. Besides, since a shocking load induced in the event of full bounding is transmitted to the vehicle body through the aforesaid mount portion, there also accrues an advantage that it is possible to prevent exertion of a large force on the motor M.

Also in the damper D of a specific construction the hydraulic damper E can be disposed in an inverted state, provided the rod 32 is connected to the second tube 62, the cylinder 30 is connected to the connecting tube 40 and the spring seat X is installed immovably in the axial direction with respect to the cylinder 30.

For implementing the same configuration as another damper D', the first and second tubes 61, 62 are omitted, a spring seat X' is provided on the rod 32, a spring seat portion Z' is provided directly on the outer periphery of the cylinder 30, a spring seat portion Y' is connected to the motor M, a spring 1' is interposed between the spring seat X' and the spring seat portion Y', and a spring 2' is interposed between the spring seat X' and the spring seat portion Z'.

Although this is a repetition, also in the damper D of a specific construction the actuator A may be constructed such that the ball screw nut 17 is connected to the rotor of the motor M to inhibit rotation of the screw shaft 16, thereby allowing the screw shaft 16 to perform a linear motion vertically in FIG. 3.

Of course, the suspension spring S may be an air spring and the springs 1, 1', 2, 2' in the damper D and another damper D' may be air springs.

Embodiments of the present invention have been described above, but it goes without saying that the scope of the present invention is not limited to the illustrated or explained details themselves.

INDUSTRIAL APPLICABILITY

The damper of the present invention is applicable to a vehicular suspension.

The invention claimed is:
1. A damper comprising:
an actuator connected to a sprung member side of a vehicle, said actuator including a motion converting mechanism for transforming a linear motion into a rotational motion and a motor to which the rotational motion resulting from the transformation by the motion converting mechanism is transmitted;
a hydraulic damper, said hydraulic damper including a cylinder, a piston inserted slidably into said cylinder and defining two pressure chambers within the cylinder, and a rod connected at one end thereof to said piston, wherein a linear motion of said actuator being transmitted to one of said rod and said cylinder, the other of said rod and said cylinder being connected to an unsprung member side of the vehicle; and biasing means being able to bias said hydraulic damper in both hydraulic damper compressing direction and hydraulic damper extending direction, said biasing means including a pair of spring seat portions immovable axially with respect to the other of said rod and said cylinder and juxtaposed axially of said cylinder, a spring seat immovable axially with respect to one of said rod and said cylinder and disposed between said spring seat portions, and a pair of springs interposed in two positions respectively between said spring seat portions and said spring seat.

2. A damper according to claim 1, wherein said spring seat portions and said spring seat are disposed on an outer periphery side of said cylinder.

3. A damper according to claim 2, wherein said spring seat includes a connecting portion connected to said rod, a tube portion suspended from an outer periphery side of said connecting portion and disposed on an outer periphery side of said hydraulic damper, and an annular flange portion formed projectingly on an outer periphery side of said tube portion, and said springs are interposed in two positions respectively between said spring seat portions and said flange portion.

4. A damper according to claim 1, wherein said motion converting mechanism comprises a screw shaft connected to said motor and a screw nut connected to said rod and threadably engaged with said screw shaft rotatably.

5. A damper according to claim 4, further comprising:
an outer tube connected to the other of said rod and said cylinder and accommodating said hydraulic damper, said spring seat portions, said spring seat and said springs; and
an inner tube covering said screw shaft and said screw nut and inserted into said outer tube.

6. A damper according to claim 1, further comprising a cushion member adapted to abut said piston before maximum contraction of said springs.

7. A damper according to claim 1, wherein said hydraulic damper includes a reservoir on an outer periphery side of said cylinder.

8. A damper according to claim 1, further comprising permitting means for permitting circumferential rotation of said springs.

9. A damper according to claim 8, wherein said permitting means comprises annular members interposed in two positions respectively between said spring seat portions and said springs, in two positions respectively between one of said springs and said spring seat and between the other of said springs and associated said spring seat portion, or in two positions respectively between one of said springs and associated said spring seat portion and between the other of said springs and said spring seat.

10. A damper comprising:
an actuator connected to a sprung member side of a vehicle, said actuator including a motion converting mechanism for transforming a linear motion into a rotational motion and a motor to which the rotational motion resulting from the transformation by the motion converting mechanism is transmitted, said motion converting mechanism including a screw shaft connected to said motor and a screw nut threadably engaged with said screw shaft rotatably;
a hydraulic damper, said hydraulic damper including a cylinder, a piston inserted slidably into said cylinder and defining two pressure chambers within the cylinder, and a rod connected at one end thereof to said piston, wherein a linear motion of said actuator being transmitted to one of said rod and said cylinder, the other of said rod and said cylinder being connected to an unsprung member side of the vehicle, said rod being connected to said screw nut;
biasing means being able to bias said hydraulic damper in both hydraulic damper compressing direction and hydraulic damper extending direction, said biasing means including a spring seat immovable axially with respect to one of said rod and said cylinder, said biasing means also including a pair of springs connected on one end to said spring seat, said biasing means also including a pair of spring seat portions each connected to another end of said pair of springs;
an outer tube connected to the other of said rod and said cylinder and accommodating said hydraulic damper, said spring seat portions, said spring seat and said springs;
an inner tube covering said screw shaft and said screw nut and inserted into said outer tube.

11. A damper according to claim 10, wherein said outer tube includes a first tube covering said inner tube and a second tube, said second tube being connected to the other of said rod and said cylinder and also connected to said first tube so as to cover one end portion of the first tube.

12. A damper according to claim 11, wherein the one end portion of said first tube is brought into abutment against said spring seat portion disposed on said actuator side to inhibit movement of the spring seat portion disposed on the actuator side toward the actuator.

13. A damper according to claim 12, wherein a suspension spring seat is provided in said outer tube.

14. A damper according to claim 11, wherein a suspension spring seat is provided in said outer tube.

15. A damper according to claim 10, wherein a suspension spring seat is provided in said outer tube.

16. A damper comprising:
an actuator connected to a sprung member side of a vehicle, said actuator including a motion converting mechanism for transforming a linear motion into a rotational motion and a motor to which the rotational motion resulting from the transformation by the motion converting mechanism is transmitted;
a hydraulic damper, said hydraulic damper including a cylinder, a piston inserted slidably into said cylinder and defining two pressure chambers within the cylinder, and a rod connected at one end thereof to said piston, wherein a linear motion of said actuator being transmitted to one of said rod and said cylinder, the other of said rod and said cylinder being connected to an unsprung member side of the vehicle; and
biasing means being able to bias said hydraulic damper in both hydraulic damper compressing direction and hydraulic damper extending direction, said biasing means including a spring seat portion immovable axially with respect to said motor, a spring seat portion immovable axially with respect to the other of said rod and said cylinder, a spring seat immovable axially with respect to one of said rod and said cylinder, and disposed between said spring seat portions, and a pair of springs interposed in two positions respectively between said spring seat portions and said spring seat.

17. A damper according to claim 16, further comprising permitting means for permitting circumferential rotation of said springs.

18. A damper comprising:

an actuator connected to a sprung member side of a vehicle, said actuator including a motion converting mechanism for transforming a linear motion into a rotational motion and a motor to which the rotational motion resulting from the transformation by the motion converting mechanism is transmitted;

a hydraulic damper, said hydraulic damper including a cylinder, a piston inserted slidably into said cylinder and defining two pressure chambers within the cylinder, and a rod connected at one end thereof to said piston, wherein a linear motion of said actuator being transmitted to one of said rod and said cylinder, the other of said rod and said cylinder being connected to an unsprung member side of the vehicle; and biasing means being able to bias said hydraulic damper in both hydraulic damper compressing direction and hydraulic damper extending direction, said biasing means including a spring seat immovable axially with respect to one of said rod and said cylinder, said biasing means also including a pair of springs connected on one end to said spring seat, said biasing means also including a pair of spring seat portions each connected to another end of said pair of springs;

permitting means for permitting circumferential rotation of said springs, said permitting means including annular members interposed in two positions respectively between said spring seat portions and said springs, in two positions respectively between one of said springs and said spring seat and between the other of said springs and associated said spring seat portion, or in two positions respectively between one of said springs and associated said spring seat portion and between the other of said springs and said spring seat.

* * * * *